3,143,561
POLY-(ALKOXY SILANES) AND THEIR PROCESS OF PREPARATION

Edward U. Elam and Robert H. Hasek, Kingsport, Tenn., assignors to Eastman Kodak Company, Rochester, N.Y., a corporation of New Jersey
No Drawing. Filed Sept. 23, 1960, Ser. No. 57,905
20 Claims. (Cl. 260—448.8)

This invention relates to novel silicon-containing polymers and their process of preparation. More particularly, this invention relates to novel silicon-containing linear polymers in which the silicon atoms are linked through 2,2,4,4-tetraalkyl cyclobutane-1,3-dioxy radicals and their process of preparation. In a specific aspect, this invention relates to novel silicon-containing polymers which are prepared by reacting an organosilane with a 2,2,4,4-tetraalkyl-1,3-cyclobutanediol.

In the past, prior art workers have been unsuccessful in their attempts to obtain stable polymers of relatively high molecular weight by reacting organosilanes with 1,3- or 1,4-glycols. For example, Krieble et al. [J. Am. Chem. Soc. 69, 2689–92 (1947)] show that aliphatic 1,3- and 1,4-glycols invariably react with either dichlorodimethylsilane or diethyldimethylsilane to form cyclic derivatives or unstable low molecular weight polymers which decompose on heating to form cyclic compounds. Thus, with linear glycols, it is not until 1,6-hexanediol is reached that a stable high polymer is formed. In addition, Kohlschutter et al. [Z. anorg. u. allgem. Chem. 271, 185–205 (1953), Chem. Abstr. 47, 7931g (1953)] reported that 1,4-butanediol reacted with dichlorodimethylsilane at temperatures below 50° C. to form a viscous reaction solution. Upon standing, the viscosity of this solution decreased and only the cyclic compound dimethyl(tetramethylene-1,4-dioxy)silane was isolated from the product. Thus, it was concluded by these prior art workers that a polymer formed initially but that it decomposed upon standing.

It is evident, therefore, that the state of the art would be greatly enhanced by providing a class of stable silicon-containing polymers which are obtained by the reaction of organosilanes with 1,3-glycols. Likewise, a noteworthy contribution to the art will be a method for the preparation of such polymers.

Accordingly, it is an object of this invention to provide, as new compositions of matter, novel silicon-containing polymers.

Another object of this invention is to provide a process for the preparation of these compositions of matter.

Another object of this invention is to provide linear, stable polymers of relatively high molecular weight, which polymers are obtained by the reaction of organosilanes with specific 1,3-glycols.

Further objects of this invention will become apparent from an examination of the following description and claims.

In accordance with this invention, it has been found that stable silicon-containing polymers of relatively high molecular weight in which the recurring units have the structure:

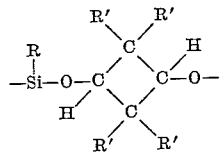

wherein R is an alkyl or aryl radical containing 1 to 10 carbon atoms and R' is a lower alkyl radical, desirably containing 1 to 4 carbon atoms, can be obtained by reacting an organosilane having the formula $R_2SiX_2$, wherein R is as defined above and X is a member selected from the group consisting of halogen, alkoxy and aryloxy radicals, with a 2,2,4,4-tetra-lower alkyl-1,3-cyclobutanediol.

In view of the prior art, as exemplified above, it would have been predicted that the reaction product of an organosilane and a 1,3-glycol would be a cyclic compound or an unstable low molecular weight polymer. In contrast, the unique reaction product obtained according to the novel process of this invention is a linear polymer of relatively high molecular weight. Furthermore, in view of this same prior art, it is even more surprising that the polymers obtained according to the process set forth herein are stable upon heating to temperatures in excess of 300° C. for fairly long periods of time.

The organosilanes which are employed in the process of this invention are well known in the art and correspond to the formula $R_2SiX_2$, wherein R is the same or different and is an alkyl or aryl radical containing 1 to 10 carbon atoms and X is the same or different and is a halogen, alkoxy or aryloxy group. Suitable R radicals include, for example, methyl, ethyl, propyl, isopropyl, butyl, isobutyl, octyl, decyl, phenyl, toluyl, naphthyl and the like. Examples of suitable X groups include chlorine, bromine, ethoxy, methoxy, butoxy, phenoxy and the like.

The 2,2,4,4-tetra-lower alkyl-1,3-cyclobutanediol reactants which are used to provide the novel silicon-containing polymers of this invention are also known in the art and correspond to the formula:

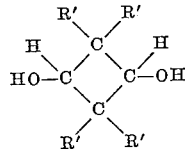

wherein R' can be the same or different and is a lower alkyl radical, desirably containing 1 to 4 carbon atoms. Examples of suitable lower alkyl radicals include methyl, ethyl, propyl, isopropyl, butyl and the like.

The novel silicon-containing polymers of this invention, as indicated above, are characterized by recurring units having the structure:

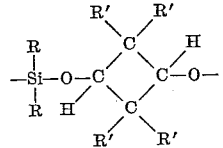

wherein R and R' are as defined above. The physical characteristics of these polymers range from viscous oils to waxy solids and have molecular weights within the range of about 400 to about 40,000, with the preferred polymers having molecular weights within the range of about 500 to about 10,000.

The reaction which takes place in the process of this invention can be represented by the general equation:

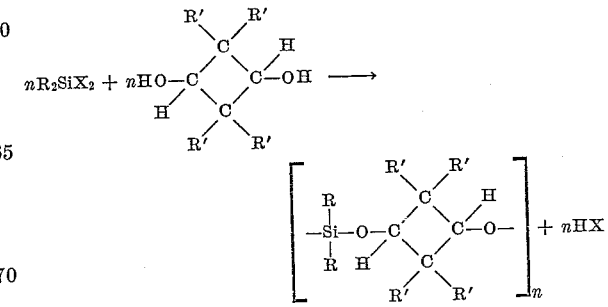

wherein R, R' and X are as defined above and n is an integer greater than 1. The exact conditions under which the reaction is to be conducted will vary within the range of about 25° C. to about 300° C. depending upon the particular organosilane employed. With the dialkyl dihalosilanes we have found that temperatures within range of about 25° C. or lower to about 150° C. or higher are particularly desirable. The reaction in this case is analogous to the preparation of an ester from an acid chloride and an alcohol and, therefore, the same general type of reaction conditions have been found to be quite satisfactory. Although the reaction can be made to take place at extremely low temperatures, for practical reasons, it is usually preferable to operate at 25° C. or above. The maximum temperature limit is determined chiefly by the necessity for keeping the mixture cool enough so that the dihalosilane is not volatilized before it reacts with the diol. When a volatile silane such as, for example, dichlorodimethylsilane is employed, it has been found that excellent results are obtained if the temperature is held below 100° C. in the early stages of the reaction. Under these conditions, it is convenient to use a basic material such as tertiary amine, for example, to act as an acceptor for the hydrogen halide liberated. Suitable acceptors are exemplified by tertiary amines such as pyridine, tributylamine and quinoline. Alternatively, hydrogen halide can be swept from the reaction mixture by passing in a stream of inert gas, for example, nitrogen. When the organosilane employed in the reaction is a dialkyldialkoxysilane, it is desirable to remove most of the alcohol formed in the reaction at solution temperatures within 100° C. of the boiling point of the particular alcohol. The molecular weight of the polymer is then built up by heating in vacuo to remove the last traces of alcohol. The maximum temperature in this mode of operation is determined by the thermal stability of the polymer with temperatures within the range of about 250° to 300° C. being satisfactory. However, under certain circumstances, even higher temperatures can be employed. The pressure employed, if any, should be such that at the temperature of operation at least some of the reaction mixture is in liquid phase.

The ratios of the reactants used in the process of this invention will depend upon the type of polymer desired and are, therefore, subject to wide variation. For example, satisfactory results can be obtained wherein the mole ratio of organosilane to the 2,2,4,4-tetra-lower alkyl-1,3-cyclobutanediol is within the range of about .2 to about 2.0 and more preferably within the range of about .5 to about 1.5.

The novel silicon-containing polymers prepared by the process of this invention can be used as textile finishing agents. When used for this purpose, the polymers described can be employed either alone or in admixture with other finishing agents such as, for example, polyethylene waxes. A typical textile finishing composition and its effectiveness is illustrated in Example 5 which follows.

This invention can be further illustrated by the following examples of preferred embodiments thereof although it will be understood that these examples are included merely for purposes of illustration and are not intended to limit the scope of the inventon unless otherwise specifically indicated:

*Example 1*

A solution of 144 g. (1 mole) of 2,2,4,4-tetramethyl-1,3-cyclobutanediol (an approximately 1:1 mixture of cis- and trans-isomers) in 300 ml. of reagent grade benzene and 160 g. (2 moles) of pyridine was placed in a 1-liter flask fitted with a reflux condenser, stirrer, and dropping funnel. The mixture was stirred vigorously and 129 g. (1 mole) of dichlorodimethylsilane was added slowly. A voluminous precipitate separated almost immediately. The mixture was stirred vigorously and refluxed about 15 hours, then cooled and filtered. The filtrate was evaporated to dryness on the steam bath. The solid material removed by filtration was stirred with water to dissolve the pyridine hydrochloride, and the insoluble polymer was added to the residue from evaporation of the benzene filtrate. The total yield of polymer was 200 g. (100%). This material melted at about 85–95° C.

Approximately 100 g. of this crude polymer was dissolved in 200–300 ml. of toluene and filtered to remove a small amount of haze. The clear solution was poured into a large volume of alcohol to give 71.5 g. of polymer as white granules which melted sharply at 107° C. The material solidified from the melt to a white, translucent, waxy solid.

*Analysis.*—Calcd. for $(C_{10}H_{20}O_2Si)_x$: C, 60.0; H, 10.0. Found: C, 59.9; H, 10.0; mol. wt. (ebullioscopic in benzene), approximately 5000.

As indicated above, the polymers of this invention are stable at temperatures in excess of 300° C. Thus, when a 50 g. sample of the polymer obtained above was heated to 360° C. at 1 mm., no volatile material was formed and the polymer, on cooling, was unchanged.

Similar results are obtained when the procedure of this example is repeated using 2,4-dibutyl-2,4-diethyl-1,3-cyclobutanediol as the 1,3-glycol.

*Example 2*

The length of the polymer chain in our products can be regulated by the use of chain terminating agents. To illustrate, a solution of 72 g. (0.5 mole) of 2,2,4,4-tetramethyl-1,3-cyclobutanediol in 150 ml. of reagent grade benzene and 80 g. (1.0 mole) of pyridine was placed in a 1-liter flask fitted with a stirrer, reflux condenser, and dropping funnel. The solution was refluxed and stirred while a mixture of 32 g. (0.25 mole) of dichlorodimethylsilane and 55 g. (0.5 mole) of chlorotrimethylsilane was added cautiously. The mixture was stirred and refluxed about 15 hours, then cooled and washed with water. The benzene was removed from the organic layer by evaporation on the steam bath, and the residue was filtered to give 98 g. of a water-white, moderately viscous oil. Distillation in a cyclic falling film molecular still separated the oil into the following fractions:

| Fraction | Boiling Range, °C. | Press., μ | Vol., ml. | $n_D^{20}$ |
|---|---|---|---|---|
| 1 | to 69 | to 70 | 15 | 1.4436 |
| 2 | 69–88 | 70 | 15 | 1.4436 |
| 3 | 88–111.5 | 70 | 15 | 1.4438 |
| 4 | 111.5–126 | 70 | 5 | (Solid) |
| Trap | | | 28 | (Solid) |
| Residue | | | 22 | (Solid) |

*Analysis.*—Calcd. for

C, 59.0, H, 10.6, mol. wt. 488. Found (fraction 1): C, 59.0; H, 10.7; mol. wt. 455. Calcd. for

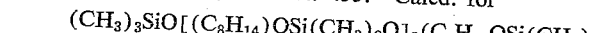

C, 59.5, H, 10.3; mol. wt., 888. Found (residue): C, 58.9; H, 10.4; mol. wt., 956.

*Example 3*

A mixture of 12.65 g. (0.05 mole) of dichlorodiphenylsilane, 7.2 g. (0.05 mole) of tetramethylcyclobutane-1,3-diol, 9.5 g. (0.12 mole) of pyridine and 150 ml. of toluene was stirred and refluxed for six hours. The product was filtered from precipitated pyridine hydrochloride, washed with water, and the solvent evaporated to give a viscous polymeric residue.

*Example 4*

A mixture of 72 g. (0.5 mole) of 2,2,4,4-tetramethyl-1,3-cyclobutanediol, 74 g. (0.5 mole) of diethoxydimethylsilane, and 0.5 g. of p-toluenesulfonic acid was heated and ethyl alcohol was removed by distillation as it was formed. The reaction was completed by stirring and heating the mixture to 300° C. at 1 mm. pressure. The resulting polymer was similar to that of Example 1.

*Example 5*

As stated hereinabove, the silicon-containing polymers of this invention are useful in textile finishing compositions. To illustrate, the properties of a cotton fabric treated with a polyethylene wax ("Epolene E") emulsion (25% non-volatile) and with a similar emulsion prepared from 75% Epolene E and 25% of the polymer described in Example 1 are compared.

The regular Epolene E emulsion and the modified emulsion were padded on untreated 80 square cotton to determine their effectiveness on finishing agents. The following results were obtained.

| Warp | Epolene E,[1] Fill | Properties | Silicon Modified Epolene E | |
|---|---|---|---|---|
| | | | Warp | Fill |
| 2.33 | 1.41 | Elmendorf Tear | 2.29 | 1.58 |
| 48.4 | 31.6 | Tensile Strength | 54.5 | 37.0 |
| 1,996 | 1,411 | Stoll-Flex Abrasion | 3,200+ | 2,500+ |
| 69 | 66 | Crease Recovery Angle | 58 | 56 |
| 11.0 | 20.5 | Tensile Strength Loss (percent) | 0 | 7.5 |

[1] Epolene E is an emulsifiable polyethylene wax having a softening point of 102° C., sp. gr. of 0.935, mol. wt. of approximately 2,500, viscosity at 250° F. of 1,500–1,900 cps., and saponification no. of 24–25. [Zimanon et al., Handbook of Material Trade Names, Supplement II, page 85, Industrial Research Service Inc., Dover, New Hampshire (1957)].

As is obvious from an examination of the above table, the increase in Stoll-Flex abrasion imparted by the modified resin is very marked. In addition, there is also a considerable decrease in tensile strength loss imparted by the modified resin.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. Poly(alkoxysilanes) consisting essentially of recurring units of the formula:

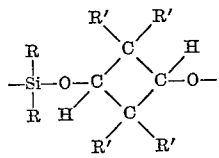

wherein R is a member selected from the group consisting of alkyl and aryl radicals containing 1 to 10 carbon atoms and R' is a lower alkyl radical, said polymer having a molecular weight in the range of about 400 to about 40,000.

2. The compound of claim 1 wherein R' is an alkyl radical containing 1 to 4 carbon atoms.

3. The compound of claim 1 wherein R is an alkyl radical containing 1 to 10 carbon atoms.

4. The compound of claim 1 wherein R is an aryl radical containing 1 to 10 carbon atoms.

5. The compound of claim 1 wherein R is a methyl radical.

6. The compound of claim 1 wherein both R and R' are methyl radicals.

7. The compound of claim 1 wherein each R is a methyl radical, two R' radicals are butyl radicals and two R' radicals are ethyl radicals.

8. A process for the preparation of a poly(alkoxysilane) which comprises reacting an organosilane having the formula $R_2SiX_2$, wherein R is a member selected from the group consisting of alkyl and aryl radicals containing 1 to 10 carbon atoms and X is at least one member selected from the group consisting of halogen, alkoxy and aryloxy radicals, with a 2,2,4,4-tetra-lower alkyl-1,3-cyclobutanediol.

9. The process in accordance with claim 7 wherein X is halogen.

10. The process in accordance with claim 7 wherein X is chlorine.

11. The process in accordance with claim 7 wherein R' is at least one alkyl radical containing 1 to 4 carbon atoms.

12. The process of claim 7 wherein each R is a methyl radical.

13. The process of claim 7 wherein each r is an ethyl radical.

14. A process for the preparation of a poly(alkoxysilane) which comprises reacting an organosilane having the formula $R_2SiX_2$, wherein R is a member selected from the group consisting of alkyl radicals containing 1 to 10 carbon atoms and X is halogen, with a 2,2,4,4-tetra-lower alkyl-1,3-cyclobutanediol at a temperature within the range of about 25° C. to about 150° C.

15. A process for the preparation of a poly(alkoxysilane) which comprises reacting an organosilane having the formula $R_2SiX_2$, wherein R is a member selected from the group consisting of alkyl and aryl radicals containing 1 to 10 carbon atoms and X is an alkoxy group, with a 2,2,4,4-tetra-lower alkyl-1,3-cyclobutanediol at a temperature within the range of about 250° to about 300° C.

16. A process for the preparation of a poly(alkoxysilane) which comprises reacting an organosilane having the formula $R_2SiX_2$, wherein R is a member selected from the group consisting of alkyl and aryl radicals containing 1 to 10 carbon atoms and X is an aryloxy group, with a 2,2,4,4-tetra-lower alkyl-1,3-cyclobutanediol at a temperature within the range of about 250° to about 300° C.

17. A process for the preparation of a poly(alkoxysilane) which comprises reacting dichlorodimethylsilane with 2,2,4,4-tetramethyl-1,3-cyclobutanediol.

18. A process for the preparation of a poly(alkoxysilane) which comprises reacting dichlorodiphenylsilane with 2,2,4,4-tetramethyl-1,3-cyclobutanediol.

19. A process for the preparation of a poly(alkoxysilane) which comprises reacting diethoxydimethylsilane with 2,2,4,4-tetramethyl-1,3-cyclobutanediol.

20. A process for the preparation of a poly(alkoxysilane) which comprises reacting dichlorodimethylsilane with 2,4-dibutyl-2,4-diethyl-1,3-cyclobutanediol.

References Cited in the file of this patent

UNITED STATES PATENTS

| 2,926,145 | McConnell et al. | Feb. 23, 1960 |
| 2,952,666 | Coover et al. | Sept. 13, 1960 |